US009515599B2

United States Patent
Franklin et al.

(10) Patent No.: US 9,515,599 B2
(45) Date of Patent: Dec. 6, 2016

(54) PHOTOVOLTAIC PANEL MOUNTING RAIL WITH INTEGRATED ELECTRONICS

(71) Applicants: Scott Franklin, Nederland, CO (US); Christopher Klinga, Boulder, CO (US); Brian Rafferty, Longmont, CO (US)

(72) Inventors: Scott Franklin, Nederland, CO (US); Christopher Klinga, Boulder, CO (US); Brian Rafferty, Longmont, CO (US)

(73) Assignee: LUMOS LSX, LLC, Boulder, CO (US)

( * ) Notice: Subject to any disclaimer, the term of this patent is extended or adjusted under 35 U.S.C. 154(b) by 344 days.

(21) Appl. No.: 14/488,932

(22) Filed: Sep. 17, 2014

(65) Prior Publication Data

US 2015/0075588 A1 Mar. 19, 2015

Related U.S. Application Data

(60) Provisional application No. 61/878,974, filed on Sep. 17, 2013.

(51) Int. Cl.
| | |
|---|---|
| *H02S 20/20* | (2014.01) |
| *H02S 40/32* | (2014.01) |
| *H02S 20/23* | (2014.01) |
| *F24J 2/52* | (2006.01) |

(52) U.S. Cl.
CPC .............. *H02S 20/20* (2014.12); *F24J 2/5203* (2013.01); *F24J 2/525* (2013.01); *F24J 2/526* (2013.01); *H02S 20/23* (2014.12); *H02S 40/32* (2014.12); *F24J 2002/5218* (2013.01); *Y02B 10/12* (2013.01); *Y02E 10/47* (2013.01)

(58) Field of Classification Search
CPC .......... H02S 20/20; H02S 20/23; H02S 40/32; F24J 2/5203; F24J 2/526; F24J 2/525; F24J 2002/5218; Y02E 10/47; Y02B 10/12
See application file for complete search history.

(56) References Cited

U.S. PATENT DOCUMENTS

| | | | |
|---|---|---|---|
| 3,827,742 | A | 8/1974 | Holden |
| 4,097,308 | A | 6/1978 | Klein et al. |
| 4,478,450 | A | 10/1984 | Picozza |
| 4,537,838 | A | 8/1985 | Jetter et al. |

(Continued)

FOREIGN PATENT DOCUMENTS

| | | | | |
|---|---|---|---|---|
| CA | 2694760 A1 * | 9/2011 | .............. | F21S 9/037 |
| CN | WO 2010045129 A2 * | 4/2010 | ............. | F24J 2/5205 |

(Continued)

*Primary Examiner* — Jeanette E Chapman
(74) *Attorney, Agent, or Firm* — Hoffmann & Baron, LLP

(57) ABSTRACT

A photovoltaic mounting rail that includes an elongate bottom wall, a mounting support, an outer sidewall and one or more electronic components. The mounting support extends upwardly from the bottom wall to a top wall and extends between the first and second ends of the rail. The outer sidewall extends upwardly from the bottom wall to a distal edge and also extends between the first and second ends of the bottom wall. The outer sidewall is spaced apart from the mounting support and defines a service channel between the outer sidewall and the mounting support. The rail is adapted for attachment of a photovoltaic panel with electronic devices to the top wall of the mounting support and the connection of the electronic devices to electronic components located within the service channel.

20 Claims, 7 Drawing Sheets

(56) References Cited

U.S. PATENT DOCUMENTS

| | | |
|---|---|---|
| 4,677,248 A | 6/1987 | Lacey |
| 5,252,141 A | 10/1993 | Inoue et al. |
| 5,290,366 A | 3/1994 | Riermeier et al. |
| 5,338,369 A | 8/1994 | Rawlings |
| 5,409,549 A | 4/1995 | Mori |
| 5,589,006 A | 12/1996 | Itoyama et al. |
| 5,706,617 A | 1/1998 | Hirai et al. |
| 5,768,831 A | 6/1998 | Melchior |
| 6,065,255 A | 5/2000 | Stern et al. |
| 6,111,189 A | 8/2000 | Garvison et al. |
| 6,269,596 B1 | 8/2001 | Ohtsuka et al. |
| 6,360,497 B1 | 3/2002 | Nakazima et al. |
| 6,465,724 B1 | 10/2002 | Garvison et al. |
| 6,528,718 B2 | 3/2003 | Yoda et al. |
| 6,649,822 B2 | 11/2003 | Eguchi et al. |
| 6,672,018 B2 | 1/2004 | Shingleton |
| 6,730,841 B2 | 5/2004 | Heckeroth |
| D496,248 S | 9/2004 | Liebendorfer |
| D496,249 S | 9/2004 | Liebendorfer |
| 6,875,914 B2 | 4/2005 | Guha et al. |
| 6,982,019 B2 | 1/2006 | Rey-Mermet et al. |
| 7,012,188 B2 | 3/2006 | Erling |
| 7,260,918 B2 | 8/2007 | Liebendorfer |
| 7,317,405 B2 | 1/2008 | Green et al. |
| 7,434,362 B2 | 10/2008 | Liebendorfer |
| 7,487,771 B1 | 2/2009 | Eiffert et al. |
| 7,634,875 B2 * | 12/2009 | Genschorek ............ F24J 2/045 403/331 |
| 7,766,292 B2 | 8/2010 | Liebendorfer |
| 7,806,377 B2 | 10/2010 | Strizki |
| D627,717 S * | 11/2010 | Munoz ........................ D13/102 |
| 8,006,452 B2 | 8/2011 | Ceria |
| 8,070,378 B2 * | 12/2011 | Gargaro, III ........... A01K 97/10 211/94.01 |
| 8,091,847 B2 * | 1/2012 | Schnitzer ............... F24J 2/5203 248/205.1 |
| 8,109,048 B2 | 2/2012 | West et al. |
| 8,128,044 B2 | 3/2012 | Liebendorfer |
| 8,156,697 B2 | 4/2012 | Miros et al. |
| 8,156,994 B2 | 4/2012 | Armstrong |
| 8,181,926 B2 * | 5/2012 | Magno, Jr. ............. F24J 2/5258 248/220.21 |
| 8,227,684 B2 | 7/2012 | Truman et al. |
| 8,250,829 B2 * | 8/2012 | McPheeters ........ E04D 13/1476 136/244 |
| 8,403,315 B2 | 3/2013 | Frankel |
| 8,443,558 B2 * | 5/2013 | Buller .................... F24J 2/5232 52/173.3 |
| 8,530,737 B2 | 9/2013 | Buller et al. |
| 8,545,298 B2 * | 10/2013 | Paggi ..................... F03D 3/002 454/364 |
| 8,595,996 B2 * | 12/2013 | Korman ................. F24J 2/5207 126/623 |
| 8,595,997 B2 * | 12/2013 | Wu ........................ F24J 2/5205 136/244 |
| 8,640,401 B2 * | 2/2014 | Hong ..................... F24J 2/5205 248/230.2 |
| 8,683,751 B2 | 4/2014 | Stearns |
| 8,683,761 B2 * | 4/2014 | Danning ................. H02S 20/23 136/251 |
| 8,752,872 B2 | 6/2014 | Kent |
| 8,794,583 B2 * | 8/2014 | Poivet ..................... F24J 2/4614 248/228.2 |
| 8,898,967 B2 * | 12/2014 | Bartelt-Muszynski F24J 2/5203 136/251 |
| 8,919,052 B2 * | 12/2014 | West ...................... F24J 2/5211 52/173.3 |
| 8,919,075 B2 * | 12/2014 | Erickson ................. H02S 40/36 52/173.3 |
| 8,925,271 B1 * | 1/2015 | Bilge ........................ E04B 1/40 52/506.05 |
| 8,984,818 B2 * | 3/2015 | McPheeters ........... F24J 2/5205 52/173.3 |
| 9,003,729 B2 * | 4/2015 | West ...................... H01L 31/042 52/173.3 |
| 9,057,540 B2 * | 6/2015 | Buettner ................ F24J 2/5243 |
| 9,057,542 B2 * | 6/2015 | Schuit .................... F24J 2/5205 |
| 9,171,980 B2 * | 10/2015 | Chiu ....................... H02S 20/22 |
| 9,273,885 B2 * | 3/2016 | Rodrigues ............... H02S 40/32 |
| 9,337,770 B2 * | 5/2016 | Okuda .................... F24J 2/4614 |
| 2003/0015636 A1 | 1/2003 | Liebendorfer |
| 2003/0150444 A1 | 8/2003 | Cedenblad |
| 2003/0184257 A1 | 10/2003 | Nomura et al. |
| 2004/0084078 A1 | 5/2004 | Yoshida et al. |
| 2004/0187909 A1 | 9/2004 | Sato et al. |
| 2006/0243318 A1 | 11/2006 | Feldmeier et al. |
| 2007/0079865 A1 | 4/2007 | Warfield et al. |
| 2009/0064606 A1 | 3/2009 | Ceria |
| 2009/0120486 A1 | 5/2009 | Buller |
| 2010/0065107 A1 | 3/2010 | Nightingale et al. |
| 2010/0071274 A1 * | 3/2010 | Brescia .................... E04B 2/88 52/27 |
| 2010/0078058 A1 | 4/2010 | Nightingale et al. |
| 2010/0089389 A1 | 4/2010 | Seery et al. |
| 2010/0139742 A1 | 6/2010 | Wayman et al. |
| 2010/0146877 A1 * | 6/2010 | Brandt .................... E02D 27/32 52/173.3 |
| 2010/0193012 A1 | 8/2010 | Klammer et al. |
| 2010/0229367 A1 | 9/2010 | Franklin |
| 2010/0294343 A1 | 11/2010 | Wexler et al. |
| 2011/0108498 A1 | 5/2011 | Haeberlein |
| 2011/0203637 A1 | 8/2011 | Patton et al. |
| 2011/0308177 A1 | 12/2011 | Hickman |
| 2011/0308566 A1 | 12/2011 | Johnson |
| 2012/0017526 A1 * | 1/2012 | Eide ...................... E04D 13/031 52/173.3 |
| 2012/0102853 A1 * | 5/2012 | Rizzo .................... F24J 2/5245 52/173.3 |
| 2012/0102854 A1 * | 5/2012 | Meier .................... F24J 2/5205 52/173.3 |
| 2012/0137600 A1 | 6/2012 | Jenkins |
| 2012/0137601 A1 | 6/2012 | Peelman et al. |
| 2013/0061912 A1 | 3/2013 | Beck et al. |
| 2013/0087519 A1 | 4/2013 | Sung |
| 2013/0269181 A1 * | 10/2013 | McBride ................. H02S 40/00 29/825 |
| 2014/0157693 A1 * | 6/2014 | Schumacher .......... H01L 31/048 52/173.3 |
| 2014/0260001 A1 * | 9/2014 | Kiik ....................... H02S 40/32 52/173.3 |
| 2014/0299179 A1 * | 10/2014 | West ...................... H01L 31/042 136/251 |
| 2015/0146018 A1 * | 5/2015 | Kayser ................. H04N 5/23241 348/207.1 |
| 2015/0218822 A1 * | 8/2015 | Blazley .................... E04D 3/30 52/173.3 |
| 2016/0111995 A1 * | 4/2016 | Nayar ..................... H02S 20/23 211/41.1 |
| 2016/0118933 A1 * | 4/2016 | Russell ................... H02S 40/32 136/251 |

FOREIGN PATENT DOCUMENTS

| | | | |
|---|---|---|---|
| DE | 2256887 A2 * | 12/2010 | .......... H02G 3/0418 |
| DE | 102013100715 | * 2/2014 | .............. E06B 7/12 |

* cited by examiner

PHOTOVOLTAIC PANEL MOUNTING RAIL WITH INTEGRATED ELECTRONICS

This application claims priority from provisional application Ser. No. 61/878,974, filed on Sep. 17, 2013, which is incorporated herein in its entirety.

FIELD OF INVENTION

The invention relates to photovoltaic panel arrangements and, particularly to mounting electronics directly onto the rails of the solar racking system.

BACKGROUND OF THE INVENTION

Photovoltaic panels produce DC (direct current) voltage. In order to feed power to a home or city electrical grid, the voltage needs to be converted to AC (alternating current). Solar arrays typically have a large central inverter that converts the system voltage from DC to AC. Power flows from the solar modules to the inverters and then to the electrical grid.

Often these large central inverters are placed in garages, sheds, hidden behind paneling, etc. to keep them protected and out of sight. Larger central inverters, however, are sometimes too large or too heavy to hide for some solar projects.

Microinverters are small inverters used to convert the output from a small number of modules from DC to AC. Depending on the capacity of the microinverter, there may be as many as one inverter for each panel. The microinverters are physically smaller and lighter than larger central inverters although more of them are needed to take the place of the larger central inverters.

Solar panels may also be connected to power optimizers, which are used to maximize the energy developed from the solar modules. Such optimizers are known in the art and can individually tune the performance of a photovoltaic panel to match the performance of an inverter. Microinverters can combine a power optimizer and small inverter in a single housing that is used for every panel. Alternatively, a power optimizer may be located separate from the inverter in a separate housing.

SUMMARY OF THE INVENTION

In accordance with the present invention, a photovoltaic mounting rail with integrated electronics is provided. The rail comprises, consists of or consists essentially of an elongate bottom wall, a mounting support, an outer sidewall and one or more electronic components. The rail can be an aluminum extrusion or a molded plastic or a plastic extrusion. The bottom wall is substantially flat and includes first and second sides, first and second ends, a top surface and a bottom surface. Preferably, the bottom wall has a plurality of anchoring apertures for attaching the rail to a structure. The mounting support extends upwardly from the top surface of the bottom wall to a top wall and extends between the first and second ends of the rail. The mounting support has a first distance between the bottom wall and the top wall. The top wall can be substantially parallel to the bottom wall and can have a plurality of mounting apertures for attaching the photovoltaic panel to the rail. The mounting support can have a base formed by the bottom wall and two opposing side walls that extend between the bottom wall and the top wall. The base, top wall and two opposing side walls can have a trapezoidal shape with the bottom wall forming the base of the trapezoid. Preferably, the outer side wall is substantially parallel to the adjacent opposing side wall of the mounting support.

The outer sidewall extends upwardly from the top surface of the bottom wall to a distal edge and also extends between the first and second ends of the bottom wall. The outer sidewall has a second distance between the bottom wall and the distal edge, wherein the first distance between the bottom ad top walls of the mounting support is greater than the second distance. The outer sidewall is spaced apart from the mounting support and defines a service channel between the outer sidewall and the mounting support. The outer sidewall can be integrally formed with the bottom wall or it can be a separate unit mounted onto the rail. One or more electronic components can be located within the service channel. The outer sidewall can be flexible to facilitate access to the electronic components. Preferably, the outer wall is adjustably mounted on the bottom wall so that the size of the channel can be adjusted to accommodate electronic components of different sizes. The service channel has an opening opposite the bottom wall for the passage of wires into and out of the service channel. Preferably, the outer wall is a solid wall; however, the outer wall can also include one or more openings for the passage of wires into and out of the channel.

The rail is adapted for attachment of a photovoltaic panel to the top wall of the mounting support. The photovoltaic panel has one or more electronic devices that is/are connected to the one or more electronic components in the channel. These electronic components can include an inverter or an optimizer.

BRIEF DESCRIPTION OF THE DRAWINGS

The preferred embodiments of the photovoltaic mounting rail with integrated electronics of the present invention, as well as other objects, features and advantages of this invention, will be apparent from the accompanying drawings wherein.

DETAILED DESCRIPTION OF THE PREFERRED EMBODIMENTS

The present invention provides a rail for a solar racking system rail, which integrates electronic devices that are mounted directly onto the rail. Racking is the support structure onto which solar panels are mounted. The mounting system allows all of the electronic components to be located in one of the two rails. In order to achieve this, the photovoltaic panels can be secured to the mounting rails so that the junction boxes are all on the same side. The other rail provides support to an attachment point for the panel and would not have electronic components.

The mounting system for electronic components in a photovoltaic panel array as described herein provides several advantages. Mounting inverters/optimizers directly to a service channel in a rail system protects the electronics from weather and provides a neat and clean appearance. The arrangement of the present invention also provides for improved heat dissipation for the electronic components. Lastly, mounting the electronics directly on the rail provides for ease of construction, faster installation and wiring, and ease of maintenance.

Figure 1:
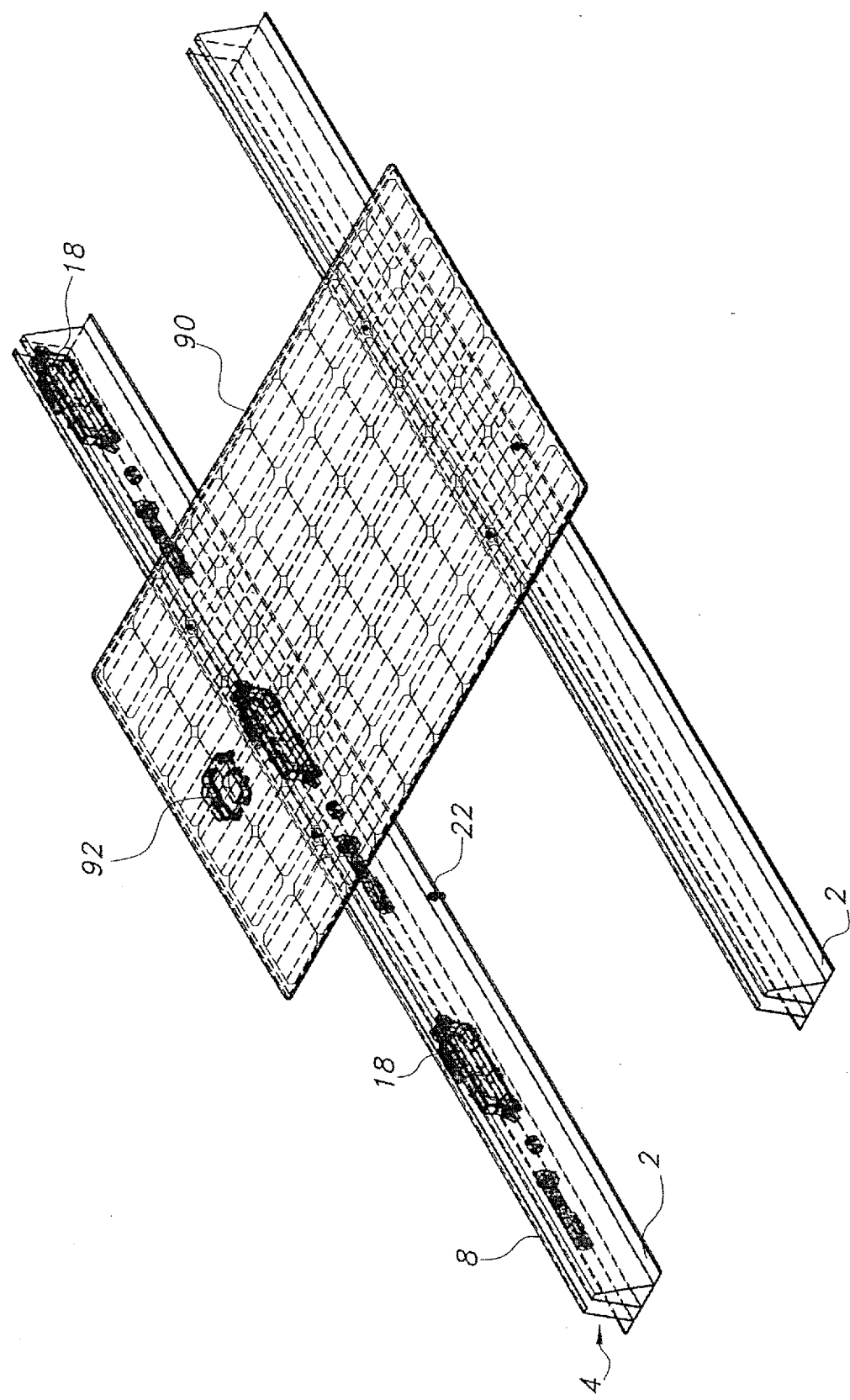
FIG. 1 is a top perspective view of the photovoltaic mounting rail with a photovoltaic panel secured thereto.
Figure 2:
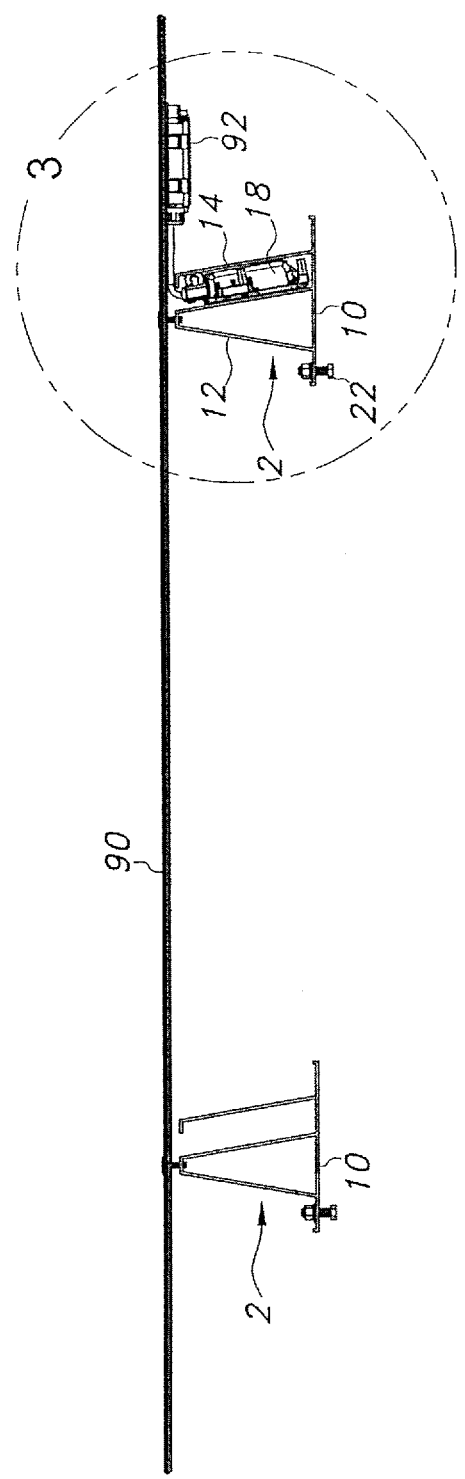
FIG. 2 is a side elevational view of a mounting rail with a photovoltaic panel secured thereto.
Figure 3:
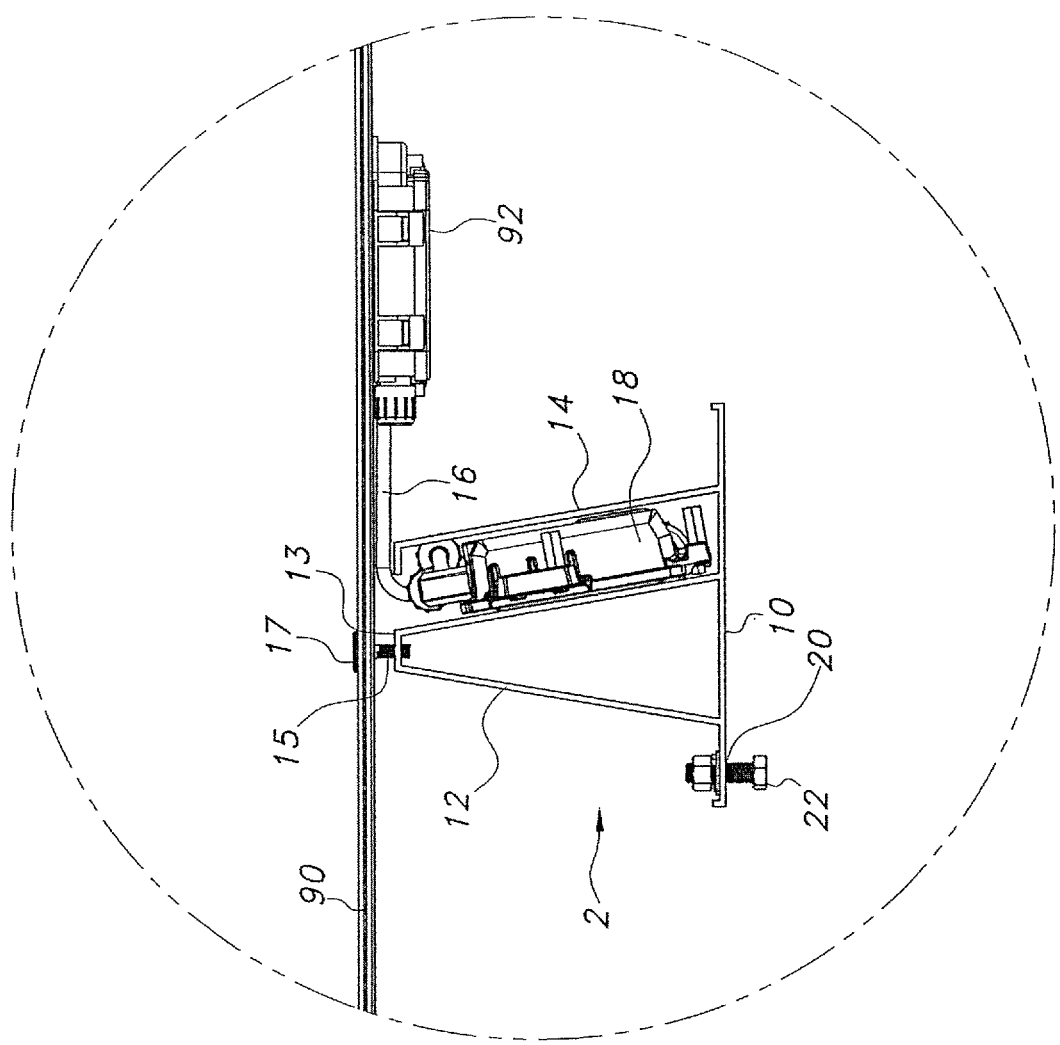
FIG. 3 is an enlarged view of section 3 of the rail shown in FIG. 2.

With reference to FIGS. 1-3, the solar racking system includes a mounting rail 2 having a mounting support 12 extending along the length thereof. The mounting support 12 is formed as an enclosed channel having a top wall 13. The top wall 13 can include one or more mounting apertures 15 for securing the photovoltaic panel 90, such as a solar module, to the mounting rail 2 using fasteners 17 (see FIG. 3).

Figure 1A:
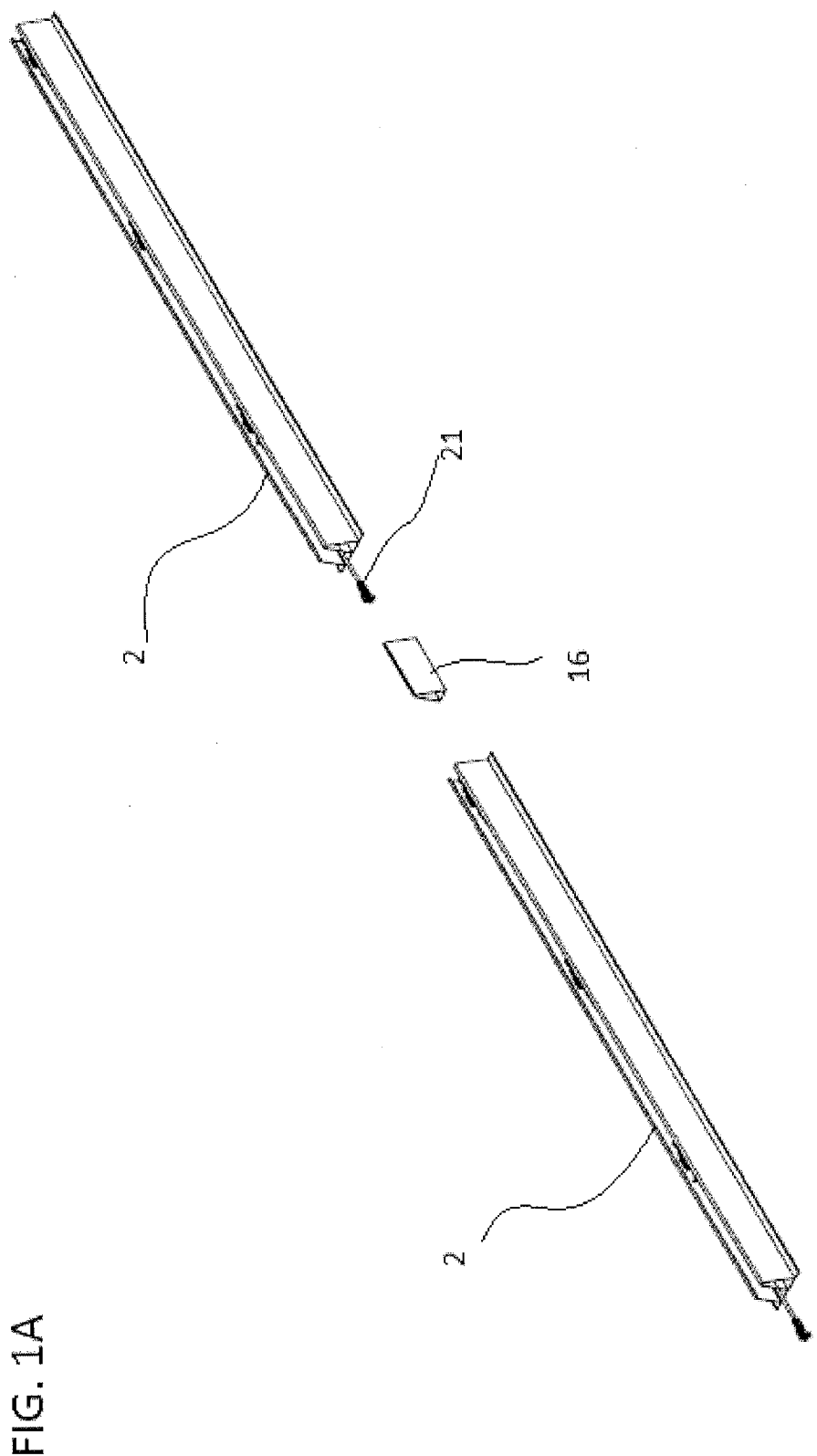
FIG. 1A is a perspective exploded view of the photovoltaic mounting rail shown with a splice.

The mounting rail 2 may also include a service channel 8 in which microinverters and/or optimizers 18 can be mounted. The service channel 8 can be integrally formed with the rail 2. With reference to FIGS. 1-3, the rail 2 can include a bottom wall 10 and a mounting support 12 extending upwardly therefrom. An outer sidewall 14 is spaced from the mounting support 12 and extends upwardly from the bottom wall 10. The space between the mounting support 12 and the outer sidewall 14 provides a channel 8 or semi-enclosed interior in which the electronic components 18 are mounted. The service channel 8 includes an opening at the top, which extends along the length of the rail 2. The opening allows wires 16 to pass into and out of the service channel 8 and also provides an opening for positioning electronics 18 inside the channel 8. Multiple mounting rails 2 can be mechanically joined end to end by a splice 19 inserted in the rails. The rails 2 can also be electrically connected together by connecting a wiring 16 from one rail 2 with wiring 16 of the other rail adjacent rail as shown in FIG. 1A.

With reference to FIG. 1, one or more inverters and/or optimizers 18 may be located in the channel 8 of the rail 2. The photovoltaic panel 90 disposed on top of the mounting rail 2 has a junction box 92 on the lower surface thereof. The junction box 92 includes wiring 16, which can be electrically connected to the inverters 18. The outer sidewall 14 extends along the length of the rail 2 and, therefore, the service channel 8 extends along the entire length of the rail 2. The rail 2 may be formed of a rigid material such as extruded aluminum. In one embodiment, the outer sidewall may be formed so that it can be deflected outwardly to an extent in order to allow the electronic components 18 to be placed within the service channel 8. The outer sidewall 14 can be deflected by reducing the thickness thereof or forming the outer sidewall from a flexible plastic or elastomer material. Alternatively, the electronic components 18 may be slid in through an end opening at each end of the channel 8 or through the top of the service channel 8.

In the embodiment shown in FIGS. 1-3, the service channel 8 is integrally formed with the support member 12 on the rail 2. It is also within the scope of the present invention that the service channel 8 may be separately formed and adjustably fastened or clipped onto the support member or bottom wall 10 of the rail 2. This permits the size of the channel 8 to be adjusted. For example, the outer sidewall 14, which defines the service channel 8, may be clipped or bolted onto the rail 2 in order to create the open space defining the service channel 8.

It is also within the contemplation of the invention that the electronic components 18 may be mounted within the rail 2 prior to installation of the photovoltaic panels 90, thereby simplifying the installation of an array of panels at the job site. Essentially, the rail 2 would be pre-wired, therefore; an installer would simply have to connect the wiring extending from the junction box 92 of the panel 90 to the inverter 18.

While the present invention shows a particular shape of the rail 2, it is within the scope of the present invention that the rail 2 may take on a variety of different configurations depending on the particular application. Furthermore, the bottom wall 10 of the rail 2 may include one or more anchoring apertures 20 to allow a fastener 22 to extend therethrough to secure the rail 2 to a structure such as the roof of a house or to a further connecting member such as a standoff which then would be attached to a support structure in a manner known in the art.

Figure 4:
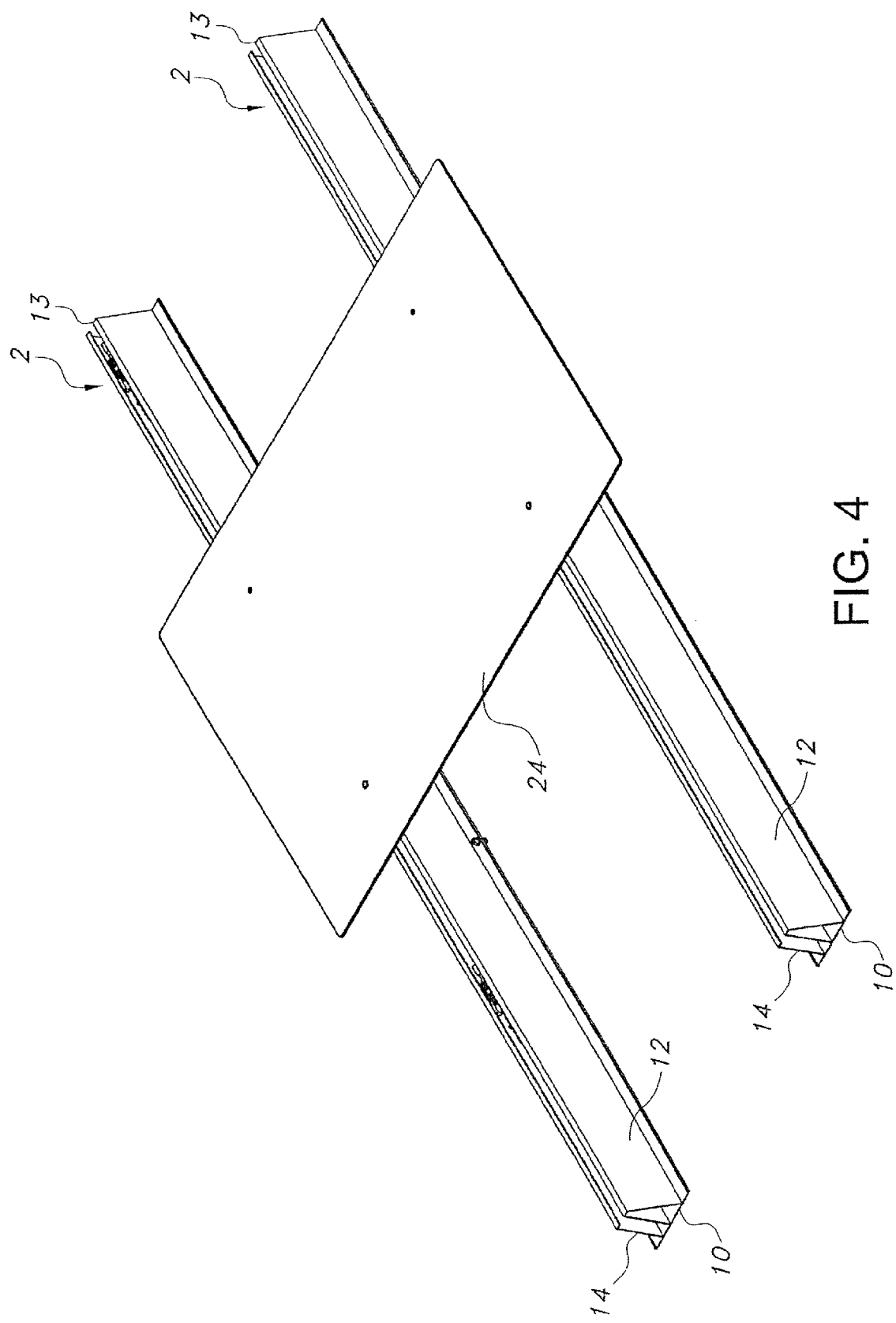
FIG. 4 is a top perspective view of a mounting rail including a photovoltaic panel removed therefrom.

As shown in FIG. 4, the rail system of the present invention is illustrated with the photovoltaic panel removed from the rails 2. Specifically, FIG. 4 illustrates the rail 2 having a mounting panel 24 mounted to a top wall 13 of the rail 2. A photovoltaic panel may be mounted to the mounting panel 24.

Figure 5:
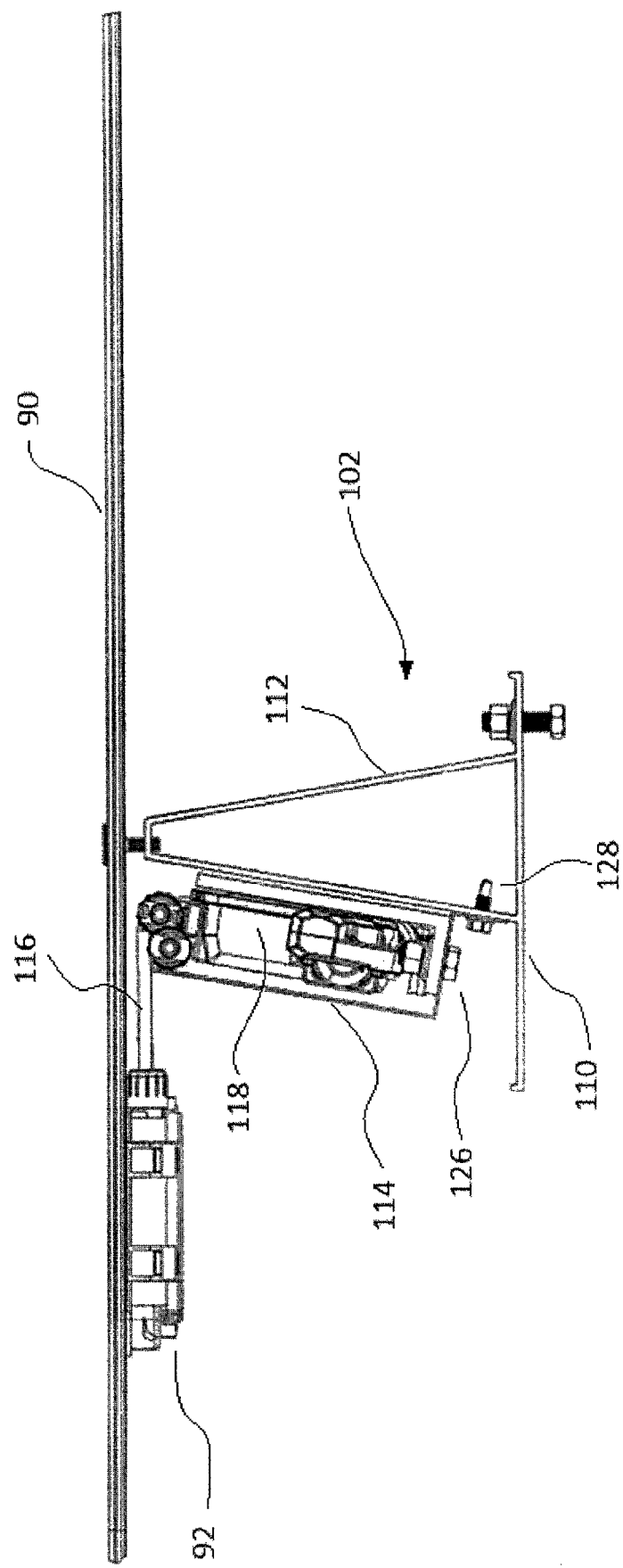
FIG. 5 is an end view of a mounting rail including a photovoltaic panel with a removable outer sidewall.

FIG. 5 shows an embodiment of the rail 102 supporting a PV panel 90 with junction box 92. The rail 102 has a base 110 and a support member 112. The exterior sidewall 114 is attached to the support member 112 by a bolt 128 and a fastener 126 is used to attach the inverter 118 to the exterior sidewall 114. After the sidewall 114 is attached to the support member 112, the inverter 118 is connected to the junction box 92 by a cable 116. This design allows the inverter 118 to be replaced by removing the exterior sidewall 114 and then replacing it with a new sidewall 114 and inverter 118.

Figure 6:
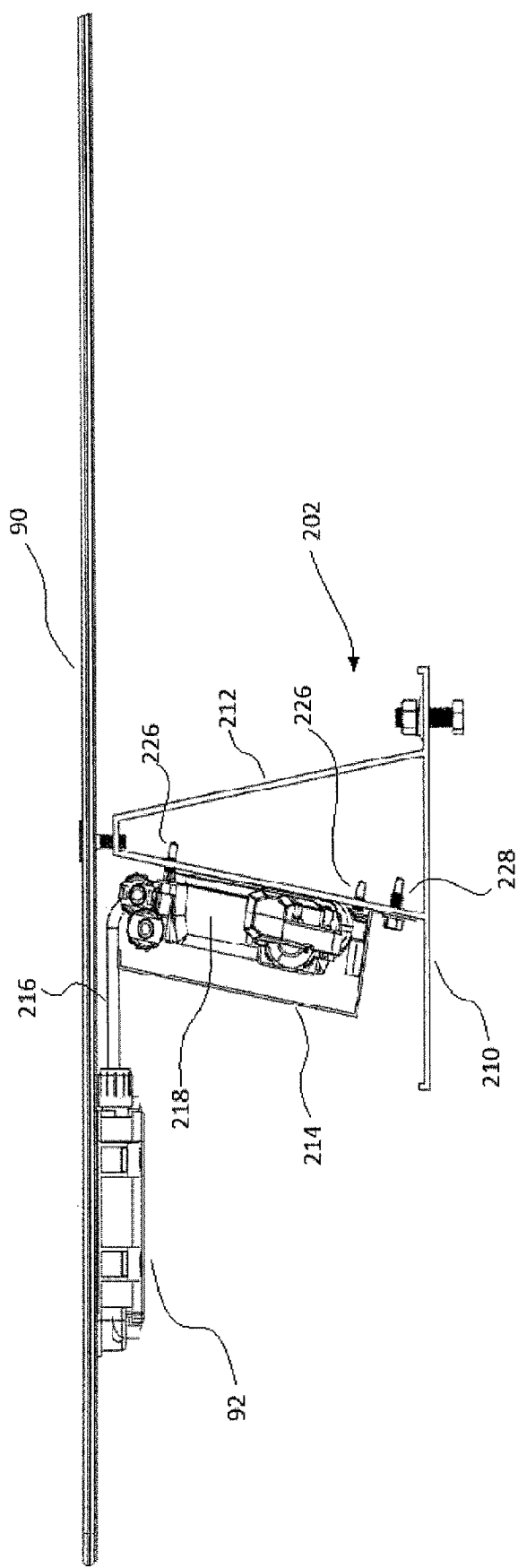
FIG. 6 is an end view of a mounting rail including a photovoltaic panel with a removable outer sidewall.

FIG. 6 shows an embodiment of the rail 202 supporting a PV panel 90 with junction box 92. The rail 202 has a base 210 and a support member 212. The exterior sidewall 214 is attached to the support member 212 by a bolt 228 and the inverter 218 is attached to the support member 212 by two fasteners 226. After the inverter 218 is attached to the support member 212, the exterior sidewall 214 is attached to the support member 212 and the inverter 218 is connected to the junction box 92 by a cable 216. This design allows the inverter 218 to be accessed by removing the exterior sidewall 214. The inverter 218 can then be serviced or replaced before the exterior sidewall 214 is reattached.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A rail for a photovoltaic panel racking system, the rail comprising:
    a substantially flat elongate bottom wall comprising first and second sides, first and second ends, a top surface and a bottom surface;
    a mounting support extending upwardly from the top surface to a top wall and extending between the first and second ends;
    an outer sidewall extending upwardly from the top surface to a distal edge and extending between the first and second ends of the bottom wall, wherein the outer sidewall is spaced apart from the mounting support and defines a service channel between the outer sidewall and the mounting support; and one or more electronic components located within the service channel, wherein the rail is adapted for attachment of a photovoltaic panel to the top wall of the mounting support, and wherein the photovoltaic panel has one or more electronic devices that is/are connected to the one or more electronic components.

2. The rail for a photovoltaic panel racking system according to claim 1, wherein the electronic components include an inverter or an optimizer.

3. The rail for a photovoltaic panel racking system according to claim 1, wherein the outer sidewall is a solid wall.

4. The rail for a photovoltaic panel racking system according to claim 1, wherein the service channel has an opening opposite the bottom wall for the passage of wires into and out of the service channel.

5. The rail for a photovoltaic panel racking system according to claim 1, wherein the mounting support has a base formed by the bottom wall and two opposing side walls extending between the bottom wall and the top wall.

6. The rail for a photovoltaic panel racking system according to claim 5, wherein the base, top wall and two opposing side walls of the mounting support have a trapezoidal shape with the bottom wall forming the base of the trapezoid.

7. The rail for a photovoltaic panel racking system according to claim 5, wherein the outer side wall is substantially parallel to the adjacent opposing side wall of the mounting support.

8. The rail for a photovoltaic panel racking system according to claim 1, wherein the outer sidewall is a separate unit mounted onto the rail.

9. The photovoltaic panel racking system rail according to claim 1, wherein the bottom wall has a plurality of anchoring apertures for attaching the rail to a structure.

10. The rail for a photovoltaic panel racking system according to claim 1, wherein the top wall has a plurality of mounting apertures for attaching the photovoltaic panel to the rail.

11. The rail for a photovoltaic panel racking system according to claim 1, wherein the mounting support has a first distance between the bottom wall and the top wall, wherein the outer sidewall has a second distance between the bottom wall and the distal edge, and wherein the first distance is greater than the second distance.

12. The rail for a photovoltaic panel racking system according to claim 1, wherein the rail is an aluminum extrusion or a plastic extrusion.

13. The rail for a photovoltaic panel racking system according to claim 1, wherein the outer sidewall is flexible.

14. The rail for a photovoltaic panel racking system according to claim 1, wherein the outer sidewall is flexible.

15. A rail for a photovoltaic panel racking system, the rail comprising:
 a substantially flat elongate bottom wall comprising first and second sides, first and second ends, a top surface and a bottom surface;
 a mounting support extending upwardly from the top surface to a top wall and extending between the first and second ends, wherein the mounting support has a first distance between the bottom wall and the top wall, and wherein the top wall has a plurality of mounting apertures for attaching the photovoltaic panel to the rail;
 an outer sidewall extending upwardly from the top surface to a distal edge and extending between the first and second ends of the bottom wall, wherein the outer sidewall is spaced apart from the mounting support and defines a service channel with an opening between the outer sidewall and the mounting support for the passage of wires into and out of the service channel, wherein the outer sidewall has a second distance between the bottom wall and the distal edge, and wherein the first distance is greater than the second distance; and
 one or more electronic components located within the service channel, wherein the rail is adapted for attachment of a photovoltaic panel to the top wall of the mounting support, and wherein the photovoltaic panel has one or more electronic devices that is/are connected to the one or more electronic components.

16. The rail for a photovoltaic panel racking system according to claim 15, wherein the mounting support has a base formed by the bottom wall and two opposing side walls extending between the bottom wall and the top wall.

17. The rail for a photovoltaic panel racking system according to claim 16, wherein the distance between the two opposing side walls of the mounting support at the bottom wall is greater than the distance between the two opposing walls at the top wall.

18. The rail for a photovoltaic panel racking system according to claim 16, wherein the outer side wall is substantially parallel to the adjacent opposing side wall of the mounting support.

19. A rail for a photovoltaic panel racking system, the rail comprising:
 a substantially flat elongate bottom wall comprising first and second sides, first and second ends, a top surface and a bottom surface;
 a mounting support extending upwardly from the top surface to a top wall and extending between the first and second ends, wherein the mounting support has a base formed by the bottom wall and two opposing side walls extending between the bottom wall and the top wall, wherein the distance between the two opposing side walls at the bottom wall is greater than the distance between the two opposing walls at the top wall, wherein the mounting support has a first distance between the bottom wall and the top wall, and wherein the top wall has a plurality of mounting apertures for attaching the photovoltaic panel to the rail;
 an outer sidewall extending upwardly from the top surface to a distal edge and extending between the first and second ends of the bottom wall, wherein the outer sidewall is spaced apart from the mounting support and defines a service channel with an opening between the outer sidewall and the mounting support for the passage of wires into and out of the service channel, wherein the outer sidewall has a second distance between the bottom wall and the distal edge, and wherein the first distance is greater than the second distance; and
 one or more electronic components located within the service channel, wherein the rail is adapted for attachment of a photovoltaic panel to the top wall of the mounting support, and wherein the photovoltaic panel has one or more electronic devices that is/are connected to the one or more electronic components.

20. The rail for a photovoltaic panel racking system according to claim 19, wherein the outer side wall is substantially parallel to the adjacent opposing side wall of the mounting support.

* * * * *